US009231397B2

(12) United States Patent
Chiu (10) Patent No.: US 9,231,397 B2
(45) Date of Patent: Jan. 5, 2016

(54) CABLE GLAND ASSEMBLY

(71) Applicant: AVC INDUSTRIAL CORP., New Taipei (TW)

(72) Inventor: Teh-Tsung Chiu, New Taipei (TW)

(73) Assignee: AVC INDUSTRIAL CORP., New Taipei (TW)

( * ) Notice: Subject to any disclaimer, the term of this patent is extended or adjusted under 35 U.S.C. 154(b) by 187 days.

(21) Appl. No.: 14/153,774

(22) Filed: Jan. 13, 2014

(65) Prior Publication Data

US 2015/0200531 A1    Jul. 16, 2015

(51) Int. Cl.
*H02G 15/02* (2006.01)
*H02G 15/013* (2006.01)
*F16J 15/02* (2006.01)
*H02G 15/184* (2006.01)

(52) U.S. Cl.
CPC ............ *H02G 15/013* (2013.01); *F16J 15/022* (2013.01); *H02G 15/184* (2013.01)

(58) Field of Classification Search
CPC ........ F16J 15/02; F16J 15/022; H02G 15/013
See application file for complete search history.

(56) References Cited

U.S. PATENT DOCUMENTS

| 1,065,515 A | 6/1913 | Ewert |
|---|---|---|
| 3,424,853 A | 1/1969 | Johnson |
| 3,603,912 A | 9/1971 | Kelly |
| 4,015,329 A | 4/1977 | Hutchison |
| 4,169,967 A | 10/1979 | Bachle |
| 4,250,348 A | 2/1981 | Kitagawa |
| 4,334,121 A | 6/1982 | Kutnyak |
| 4,583,811 A | 4/1986 | McMills |
| 4,608,454 A | 8/1986 | Lackinger |
| 4,625,998 A | 12/1986 | Draudt et al. |
| 4,630,850 A | 12/1986 | Saka |
| 4,692,563 A | 9/1987 | Lackinger |
| 4,801,158 A | 1/1989 | Gomi |
| 4,814,547 A | 3/1989 | Riley et al. |
| 4,900,068 A | 2/1990 | Law |
| 5,068,496 A | 11/1991 | Favalora |
| 5,072,072 A | 12/1991 | Bawa et al. |
| 5,310,963 A | 5/1994 | Kennelly |
| 5,321,205 A | 6/1994 | Bawa et al. |
| 5,543,582 A | 8/1996 | Stark et al. |
| 5,763,833 A | 6/1998 | Bawa et al. |
| 5,927,892 A | 7/1999 | Teh-Tsung |
| 5,929,383 A | 7/1999 | Marik et al. |
| 5,951,327 A | 9/1999 | Maril |
| 6,034,325 A | 3/2000 | Nattel et al. |
| 6,036,237 A | 3/2000 | Sweeney |
| 6,042,396 A | 3/2000 | Endo et al. |
| 6,099,046 A | 8/2000 | Oh |
| 6,162,995 A | 12/2000 | Bachle et al. |
| 6,173,995 B1 | 1/2001 | Mau |
| 6,254,145 B1 | 7/2001 | Schwarz et al. |

(Continued)

*Primary Examiner* — Gilbert Lee
(74) *Attorney, Agent, or Firm* — Ming Chow; Sinorica, LLC (57) ABSTRACT

A cable gland assembly includes a mounting member mounted in a predetermined object, one or multiple connection members, an outer cap, and one first packing device and one or multiple second packing devices mounted in the mounting member between the connection members and the outer cap and compressible by the outer cap and the connection members to wrap about the periphery of an inserted cable and to provide multiple packing effects. Thus, the cable gland assembly has high IP rating, and is practical for dynamic mechanical application, or application in a deep-water environment or high explosive atmosphere.

18 Claims, 7 Drawing Sheets

(56) References Cited

U.S. PATENT DOCUMENTS

| | | |
|---|---|---|
| 6,350,955 B1 | 2/2002 | Daoud |
| 6,435,567 B2 | 8/2002 | Kikumori et al. |
| 6,488,318 B1 | 12/2002 | Shim |
| 6,764,107 B1 | 7/2004 | Obahi et al. |
| 6,812,406 B2 | 11/2004 | Hand |
| 6,877,781 B2 | 4/2005 | Edler |
| 6,908,114 B2 | 6/2005 | Moner |
| 6,974,162 B2 | 12/2005 | Chelchowski et al. |
| 7,183,486 B2 | 2/2007 | Pyron et al. |
| 7,431,343 B2 | 10/2008 | Chiu |
| 7,504,582 B1 | 3/2009 | Chiu |
| 7,690,695 B2 | 4/2010 | Duquette et al. |
| 7,735,876 B2 | 6/2010 | Chiu |
| 8,490,513 B2 * | 7/2013 | Chiou ............... F16C 1/102 174/480 |
| 2002/0079702 A1 | 6/2002 | Baumann et al. |
| 2005/0001388 A1 | 1/2005 | Travers |
| 2005/0077722 A1 | 4/2005 | Kiely |
| 2009/0174154 A1 * | 7/2009 | Chiu ............... F16L 5/00 277/603 |

* cited by examiner

CABLE GLAND ASSEMBLY

BACKGROUND OF THE INVENTION

1. Field of the Invention

The present invention relates to cable glands and more particularly, to a cable gland assembly, which provides enhanced protection and multiple packing, airtight, waterproof, dustproof and anti-tensile effects.

2. Description of the Related Art

After installation of a cable in an electric box or any junction box of a machine, telecom or network system by means of a cable gland, the cable may be disconnected or loosened from the gland when stretched accidentally by an external force, causing leakage. To avoid this problem, many improved cable gland designs are created, such as U.S. Pat. No. 5,927,892 entitled "Device for fastening a cable to a board", U.S. Pat. No. 8,490,513 entitled "Cable gland and gasket ring assembly", U.S. Pat. No. 8,288,667 entitled "Double-packing cable and flexible conduit gland". These prior art designs commonly comprise a mounting member, a clamping member, a packing ring and an outer cap. The mounting member is connected to a board member and screw-connected with the outer cap. The clamping member is sleeved onto the packing ring in the outer cap and compressed by the outer cap to wrap the packing ring about the periphery of the inserted cable, thereby locking the cable and protecting it against moisture and water.

However, the aforesaid prior art designs simply has one packing ring set between the mounting member and the outer cap to wrap about the inserted cable, i.e., these prior art designs simply provide one single packing effect that is insufficient to firmly hold down the cable. When the cable is stretched accidentally by an external force, a water leakage can occur.

According to the cable gland with water seal rings of U.S. Pat. No. 8,490,513 and the double-packing cable and flexible conduit gland of U.S. Pat. No. 8,288,667, the packing member comprises a first packing segment compressible to clamp on the inserted flexible conduit, and a second packing segment compressible to clamp on the inserted cable, achieving double-layer packing effects. However, because the first packing segment and the second packing segment are formed in one single packing member, the first packing segment and the second packing segment can be destructed to lose its packing functioning when the flexible conduit or cable is stretched by an external force. Actually, these designs simply provide one layer of packing effect.

Further, when a cable gland is selected for dynamic mechanical application, outdoor application, or application in a deep-water environment or high explosive atmosphere, it must have a very high IP (International Protection) rating. However, the IP ratings of the aforesaid prior art designs are insufficient for dynamic mechanical application, or application in a deep-water environment or high explosive atmosphere.

Therefore, it is desirable to provide a gasket ring for cable gland, which eliminates the aforesaid problems.

SUMMARY OF THE INVENTION

The present invention has been accomplished under the circumstances in view. It is therefore the main object of the present invention to provide a cable gland assembly for securing a cable, or, a cable and a flexible conduit, which has multiple packing devices mounted in a mounting member and a connection member and set between the mounting member and an outer cap to provide enhanced protection and multiple packing, airtight, waterproof, dustproof and anti-tensile effects.

It is another object of the present invention to provide a cable gland assembly for securing a cable, or, a cable and a flexible conduit, which has a very high IP rating, practical for dynamic mechanical and outdoor applications, as well as applications in a deep-water environments and high explosive atmospheres.

To achieve these and other objects of the present invention, a cable gland assembly of the invention comprises a mounting member, at least one connection member, an outer cap, a first packing device, and at least one second packing device. The mounting member is adapted for installing in a predetermined object. The mounting member is a tubular member comprising a first outer thread. The connection member comprises a second outer thread, a first axial hole and a second axial hole axially aligned in line, a first tapered surface formed in the first axial hole and a first inner thread formed in the first axial hole. The first inner thread is threaded onto the first outer thread of the mounting member. The outer cap comprises an axial through hole, a second tapered surface formed in the axial through hole, and a second inner thread formed in the axial through hole. The second inner thread is threaded onto the second outer thread. The first packing device is mounted in the mounting member and the first axial hole of the connection member, comprising a first packing sleeve, and a first clamping member sleeved onto the first packing sleeve. The first packing sleeve comprises an axially extended first through hole. The second packing device is mounted in the outer cap and the second axial hole of the connection member. The second packing device comprises a second packing sleeve and a second clamping member sleeved onto the second packing sleeve. The second packing sleeve comprises an axially extended second through hole. The second packing device and the first packing device are identical and exchangeable.

Thus, when a cable is mounted in the cable gland assembly, the first packing device that is set between the mounting member and the connection member is compressed to wrap about the periphery of the cable and to provide a first layer of airtight, waterproof, dustproof and anti-tensile protection, and the second packing device that is set between the connection member and the outer cap is compressed to wrap about the periphery of the cable and to provide a second layer of airtight, waterproof, dustproof and anti-tensile protection. Thus, the cable gland assembly of the invention has a high IP rating, and is practical for dynamic mechanical and outdoor applications, as well as applications in a deep-water environments and high explosive atmospheres.

The cable gland assembly of the invention has the benefits as follows:

When compared with conventional cable gland designs, the invention has the added connection member to provide enhanced protection and enhanced tensile strength. By means of increasing the number of the connection member, the protection and tensile strength levels are relatively enhanced.

By means of increasing the number of the connection member, the airtight strength of the cable gland assembly is enhanced to meet different industrial requirements for application under a high explosive atmosphere.

By means of increasing the number of the connection member, the watertight strength of the cable gland assembly is enhanced to meet different industrial requirements for application in a deep-water environment.

By means of increasing the number of the connection member, the airtight strength of the cable gland assembly is enhanced to meet different industrial requirements, preventing disconnection of the installed cable upon an impact.

DETAILED DESCRIPTION OF THE PREFERRED EMBODIMENT

Referring to FIGS. 1-4, a cable gland assembly 100 in accordance with the present invention is shown. The cable gland assembly 100 comprises:

a mounting member 10 that is a tubular member mounted in a board member 80 of an electric box, machine, telecom box or network communication box, comprising a first outer thread 11;

a connection member 20 that comprises a second outer thread 21, a first axial hole 22, a second axial hole 25 in communication and axial alignment with the first axial hole 22, a first tapered surface 23 defined therein around one end of the first axial hole 22 and one end of the second axial hole 25, and a first inner thread 24 defined in the first axial hole 22 and threaded onto the first outer thread 11 of the mounting member 10;

an outer cap 30 that comprises an axial through hole 31 extending through two opposite ends thereof, a second tapered surface 32 defined in the axial through hole 31, and a second inner thread 33 defined in the axial through hole 31 at one side relative to the second tapered surface 32 and threaded onto the second outer thread 21 of the connection member 20;

a first packing device 40 that comprises a first packing sleeve 41 mounted in the mounting member 10 and the first axial hole 22 of the connection member 20 and defining therein an axially extended first through hole 411, and a first clamping member 42 mounted in the mounting member 10 and the first axial hole 22 of the connection member 20 and sleeved onto the first packing sleeve 41; and a second packing device 50 that comprises a second packing sleeve 51 mounted in the axial through hole 31 of the outer cap 30 and the second axial hole 25 of the connection member 20 and defining therein an axially extended second through hole 511, and a second clamping member 52 mounted in the axial through hole 31 of the outer cap 30 and the second axial hole 25 of the connection member 20 and sleeved onto the second packing sleeve 51.

The first packing device 40 and the second packing device 50 are identical and exchangeable.

After insertion of a cable 90 through the cable gland assembly 100 during application, the connection member 20 and the first packing device 40 are set between the mounting member 10 and the outer cap 30 to hold down the cable 90 and to provide a first layer of airtight, waterproof, dustproof and anti-tensile protection, and the second packing device 50 is forced by the outer cap 30 against the periphery of the cable 90 to provide a second layer of airtight, waterproof, dustproof and anti-tensile protection. Thus, the cable gland assembly of the present invention effectively provides enhanced protection and multiple packing, airtight, waterproof, dustproof and anti-tensile effects.

Figure 1:
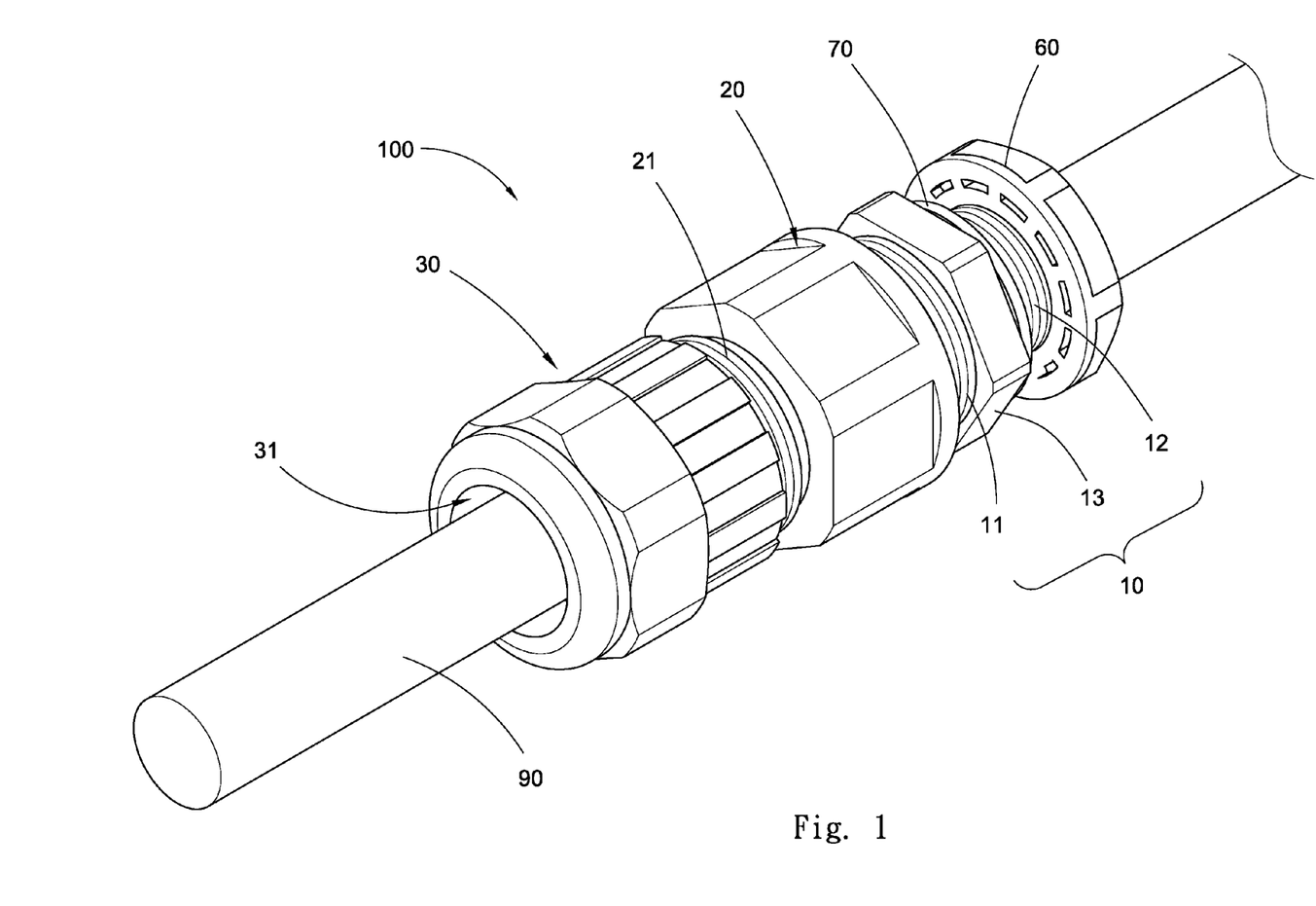
FIG. 1 is an oblique top elevational view of a cable gland assembly in accordance with the present invention.
Figure 2:
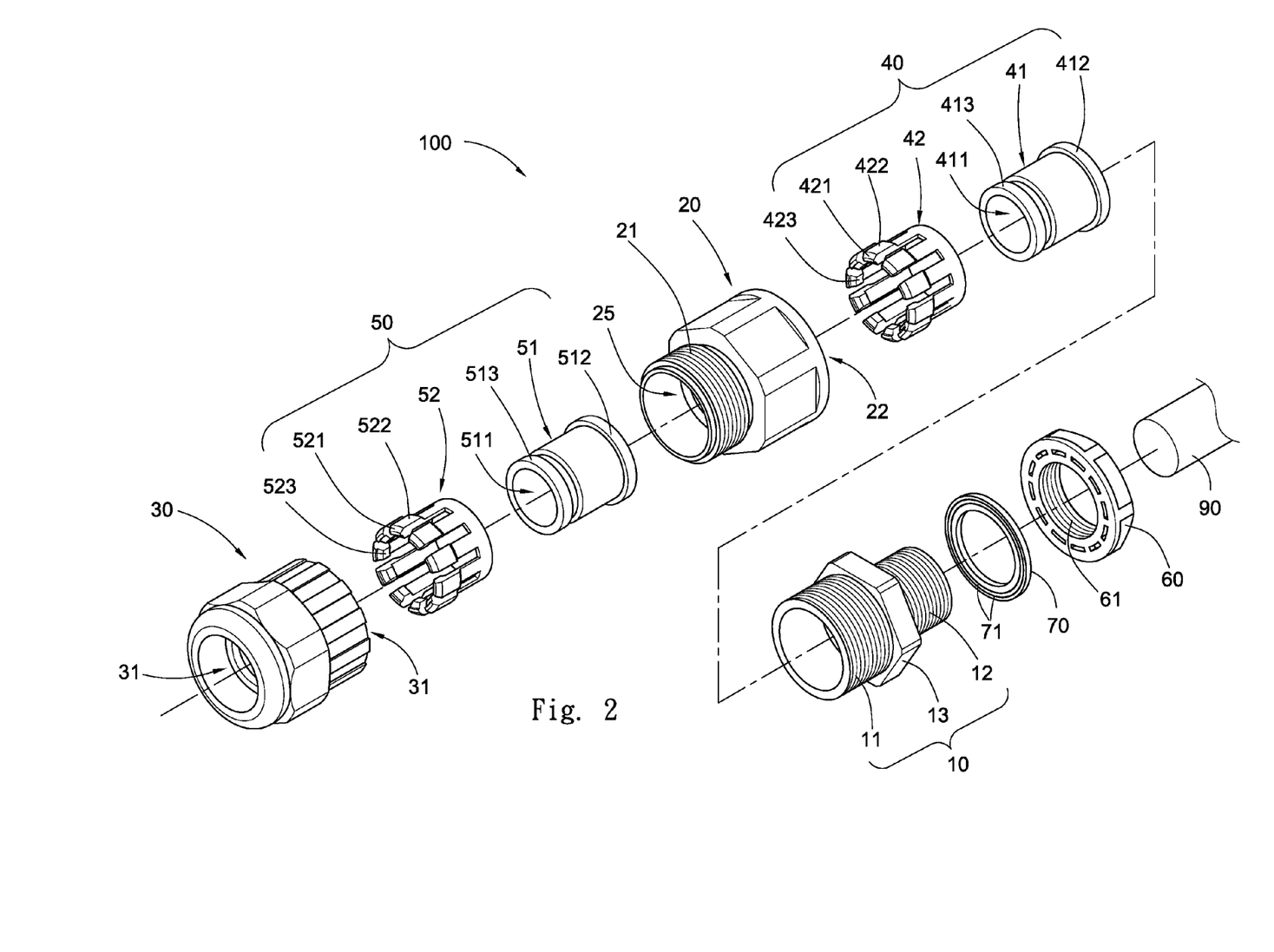
FIG. 2 is an exploded view of the cable gland assembly in accordance with the present invention.
Figure 3:
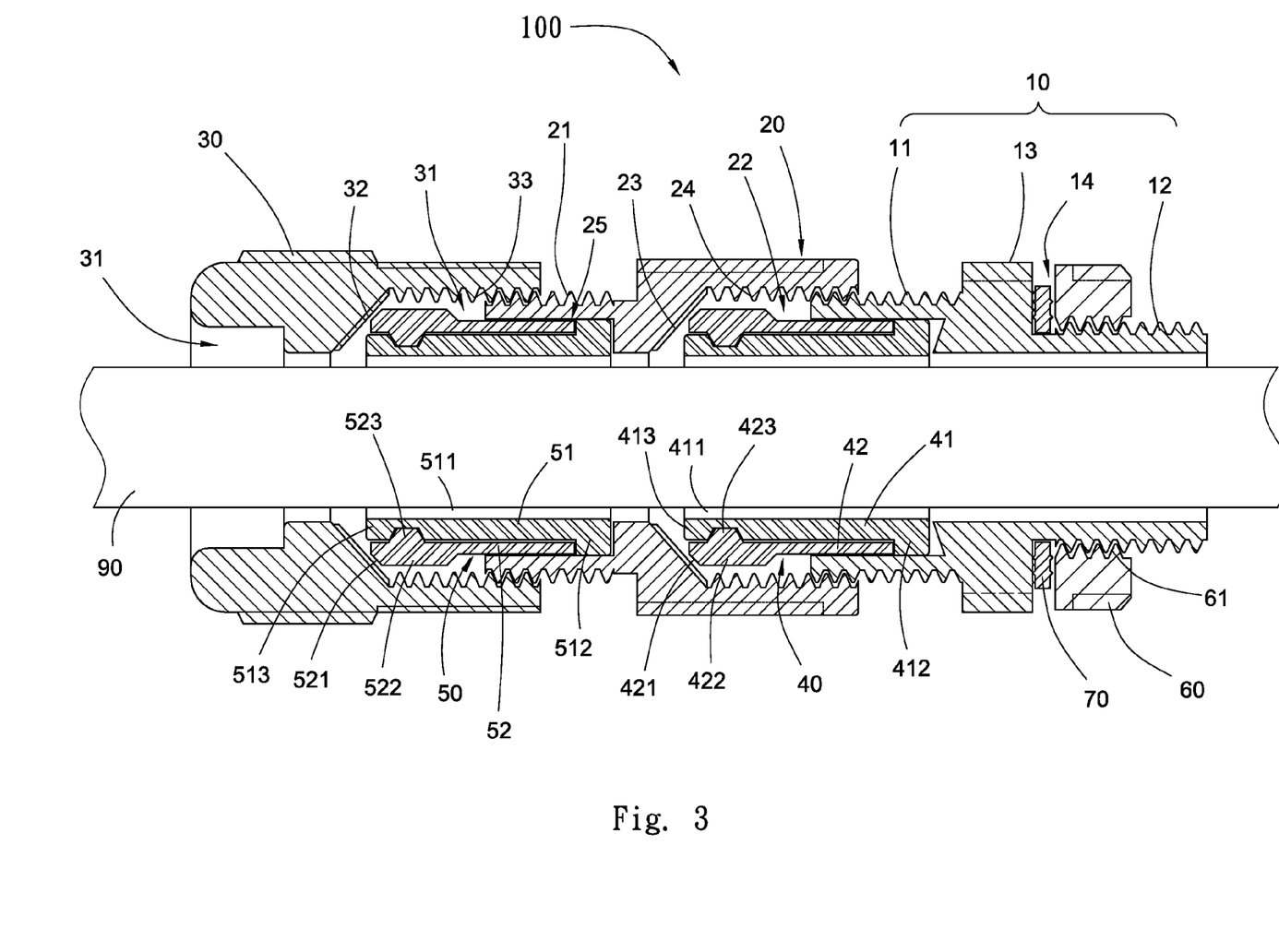
FIG. 3 is a longitudinal sectional view of the cable gland assembly in accordance with the present invention.
Figure 4:
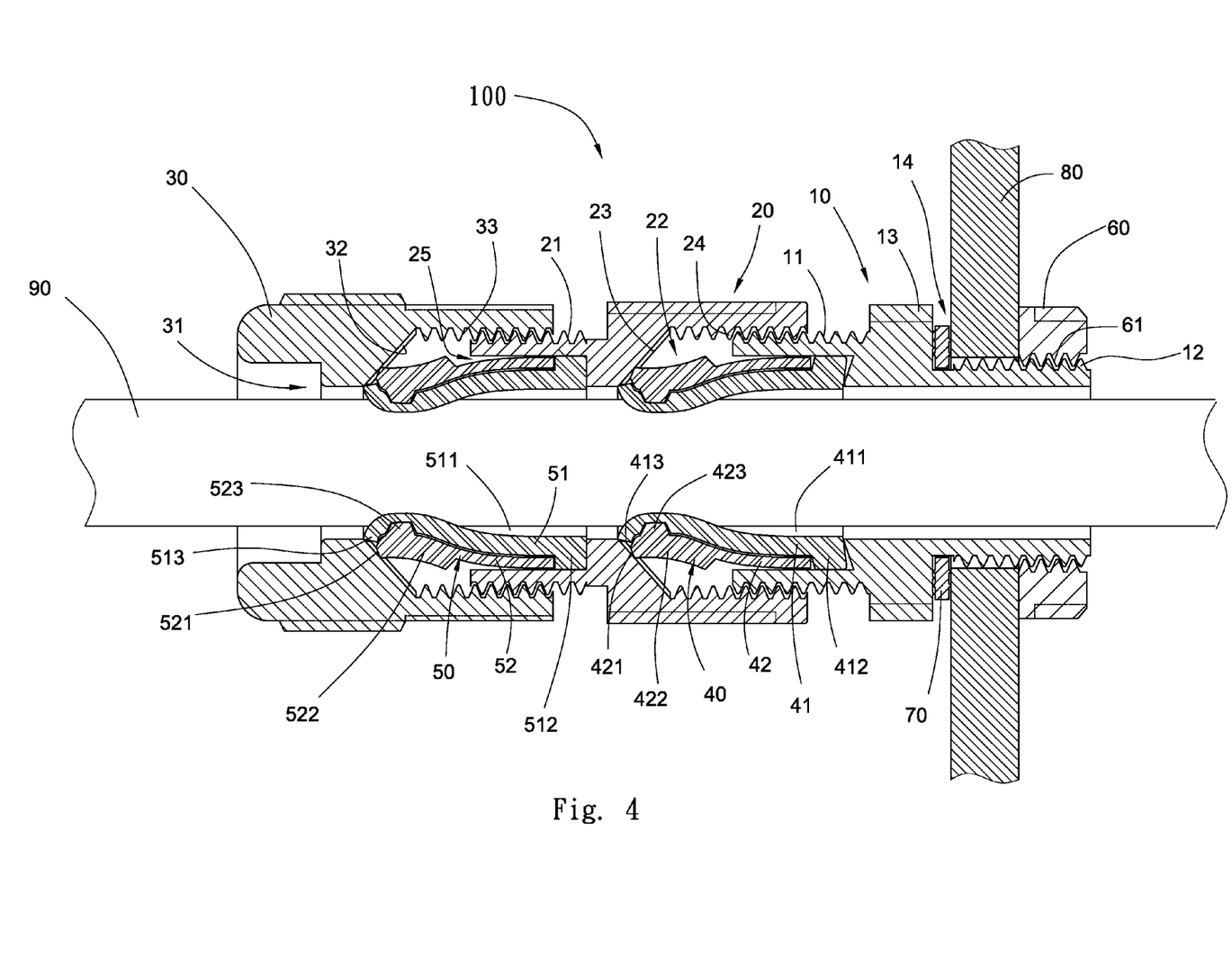
FIG. 4 is a sectional applied view of the cable gland assembly in accordance with the present invention.

Referring to FIGS. 2-4, the mounting member 10 further comprises a third outer thread 12, and a stop flange 13 extending around the periphery thereof between the first outer thread 11 and the third outer thread 12. The cable gland assembly 100 further comprises a locking member 60 that has an inner thread 61 threaded onto the third outer thread 12 of the mounting member 10. After insertion of the mounting member 10 into the board member 80, the stop flange 13 is stopped at one side of the board member 80, and the locking member 60 is threaded onto the third outer thread 12 of the mounting member 10 and stopped at an opposite side of the board member 80.

After installation, the stop flange 13 and the locking member 60 are respectively stopped at two opposite sides of the board member 80, locking the mounting member 10 to the board member 80 against axial displacement.

Preferably, the mounting member 10 further comprises a locating groove 14 extending around the periphery thereof between the stop flange 13 and the third outer thread 12. Further, a gasket ring 70 is mounted in the locating groove 14 and sealed between the stop flange 13 of the mounting member 10 and the board member 80.

The gasket ring 70 is an elastic member made of, for example, rubber, and squeezed in between the stop flange 13 of the mounting member 10 and the board member 80 to prevent water leakage.

Further, because the gasket ring 70 is mounted in the locating groove 14 at one side of the stop flange 13 of the mounting member 10, it will not fall out of the mounting member 10 during delivery.

Referring to FIGS. 2 and 3 again, the first packing device 40 and the second packing device 50 can be made of an elastic material, such as rubber, plastics or silicon rubber.

Referring to FIGS. 2-4 again, the first packing sleeve 41 further comprises an end flange 412. After sleeved the first clamping member 42 onto the first packing sleeve 41, one end of the first clamping member 42 is stopped at the end flange 412. Thus, the first clamping member 42 can be positively compressed to radially force the first packing sleeve 41 against the periphery of the cable 90.

Thus, after the first clamping member 42 is sleeved onto the first packing sleeve 41, the end flange 412 effectively stops the first clamping member 42 in place.

Further, the first packing sleeve 41 comprises a neck portion 413 made in the form of an annular recess around the periphery. The first clamping member 42 comprises a plurality of equiangularly spaced pawls 422 respectively terminating in a respective clamping block 423 that is engaged into the neck portion 413.

When the first clamping member 42 is radially compressed to force the pawls 422 against the first packing sleeve 41, the inside wall of the first packing sleeve 41 around the through hole 411 is wrapped about the periphery of the cable 90 tightly, preventing displacement between the first packing sleeve 41 and the cable 90.

Preferably, the first clamping member 42 of the first packing device 40 further comprises a beveled edge 421 located on an outer end of each clamping block 423 for stopping against the first tapered surface 23 of the connection member 20.

Referring to FIG. 4 again, the first tapered surface 23 of the connection member 20 is stopped against the beveled edge 421 of the first clamping member 42, causing the first packing sleeve 41 and the first clamping member 42 to be radially inwardly compressed to wrap about the periphery of the cable 90.

Referring to FIGS. 2-4 again, the second packing sleeve 51 further comprises end flange 512. After sleeved the second clamping member 52 onto the second packing sleeve 51, one end of the second clamping member 52 is stopped at the end flange 512. Thus, the second clamping member 52 can be positively compressed to radially force the second packing sleeve 51 against the periphery of the cable 90.

Further, the second packing sleeve 51 comprises a neck portion 513 made in the form of an annular recess around the periphery. The second clamping member 52 comprises a plurality of equiangularly spaced pawls 522 respectively terminating in a respective clamping block 523 that is engaged into the neck portion 513.

When the second clamping member 52 is radially compressed to force the pawls 522 against the second packing sleeve 51, the inside wall of the second packing sleeve 51 around the through hole 511 is wrapped about the periphery of the cable 90 tightly, preventing displacement between the second packing sleeve 51 and the cable 90.

Preferably, the second clamping member 52 of the second packing device 50 further comprises a beveled edge 521 located on an outer end of each clamping block 523 for stopping against the second tapered surface 32 of the outer cap 30.

The second tapered surface 32 of the outer cap 30 is stopped against the beveled edge 521 of the second clamping member 52, causing the second packing sleeve 51 and the second clamping member 52 to be radially inwardly compressed to wrap about the periphery of the cable 90.

After introduction of the structural detail and composition of the component parts of the cable gland assembly, the features and advantages of the cable gland assembly will now be outlined hereinafter.

Referring to FIG. 4 again, when connecting the cable gland assembly to the cable 90, insert the cable 90 properly through the through hole 31 of the outer cap 30, the second through hole 511 of the second packing sleeve 51, the first through hole 411 of the first packing sleeve 41 and the mounting member 10, and then fasten tight the outer cap 30 (rotate the outer cap 30 in direction toward the connection member 20) to force the second tapered surface 32 of the outer cap 30 against the beveled edge 521 of the second clamping member 52 of the second packing device 50, thereby radially inwardly compressing the second packing sleeve 51 to wrap the second packing sleeve 51 about the periphery of the cable 90.

Thereafter, fasten tight the connection member 20 (rotate the connection member 20 in direction toward the mounting member 10) to force the first tapered surface 23 of the connection member 20 against the beveled edge 421 of the first clamping member 42 of the first packing device 40, thereby radially inwardly compressing the first packing sleeve 41 to wrap the first packing sleeve 41 about the periphery of the cable 90.

Thus, the cable 90 is compressed by the first packing sleeve 41 and the second packing sleeve 51 and prohibited from displacement relative to the cable gland assembly, and thus, the invention achieves enhanced protection and multiple packing, airtight, waterproof, dustproof and anti-tensile effects.

Further, in addition to the protection of the mounting member 10 and the outer cap 30, the cable 90 is also well protected by the connection member 20, i.e., the invention provides long distance and large area protection to the cable 90.

In general, the use of the connection member and packing devices in the cable gland assembly provides enhanced protection and multiple packing, airtight, waterproof, dustproof and anti-tensile effects. Similar to the principle of tug of water that more people involve in a tug-of-war, a relatively greater force will be produced. The invention uses multiple packing devices to enhance the packing, airtight, waterproof, dustproof and anti-tensile effects. Thus, the invention is practical for dynamic mechanical application, outdoor application, as well as applications in deep-water environments or high explosive atmospheres.

It is worth mentioning that the invention provides an externally forced design to obtain a high IP rating and to eliminate the drawback of the internally forced prior art designs, making the cable gland assembly practical for use under severe weather condition or in a deep-water environment.

Figure 5:
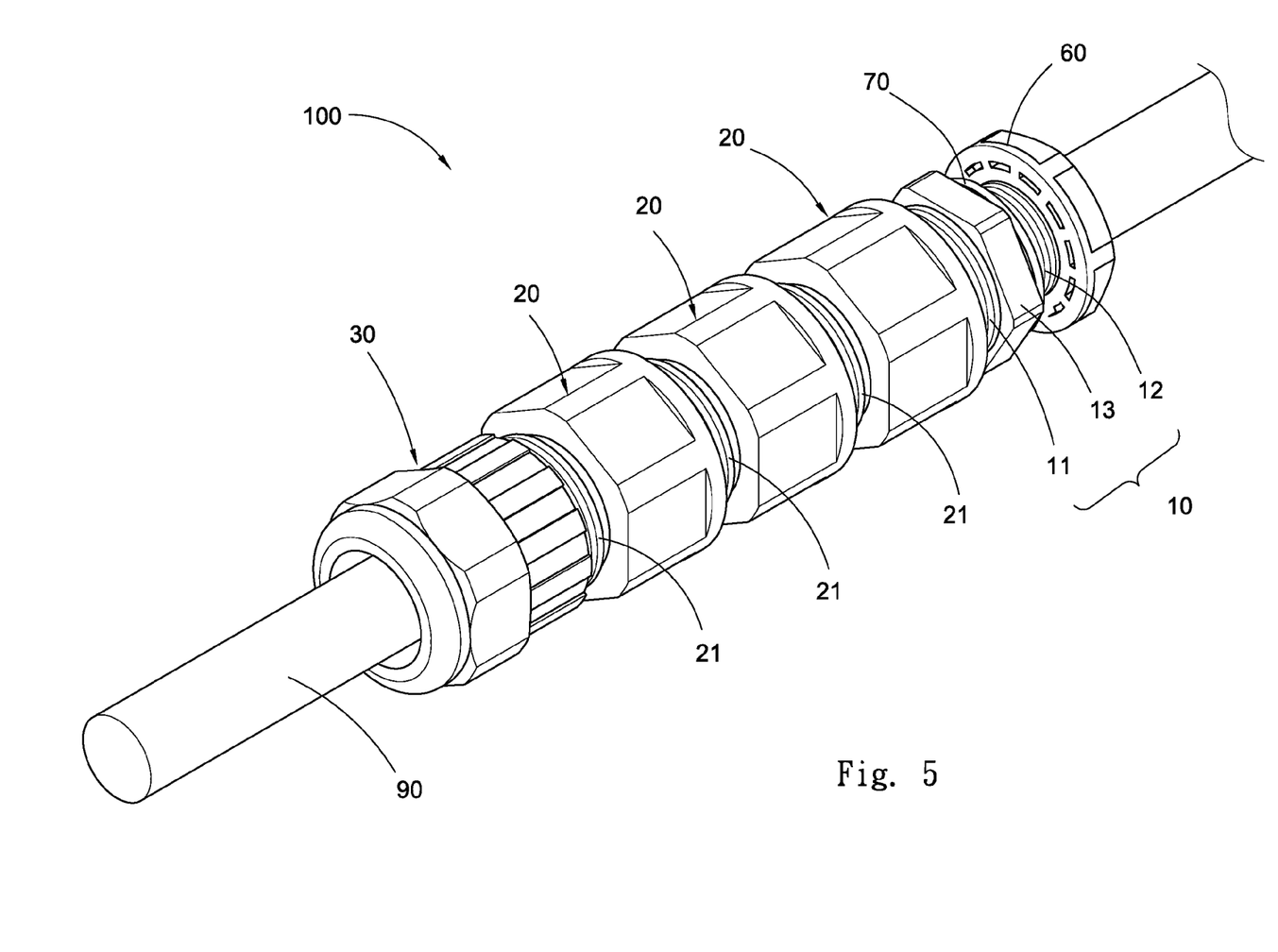
FIG. 5 is an elevational view of an alternate form of the cable gland assembly in accordance with the present invention.
Figure 6:
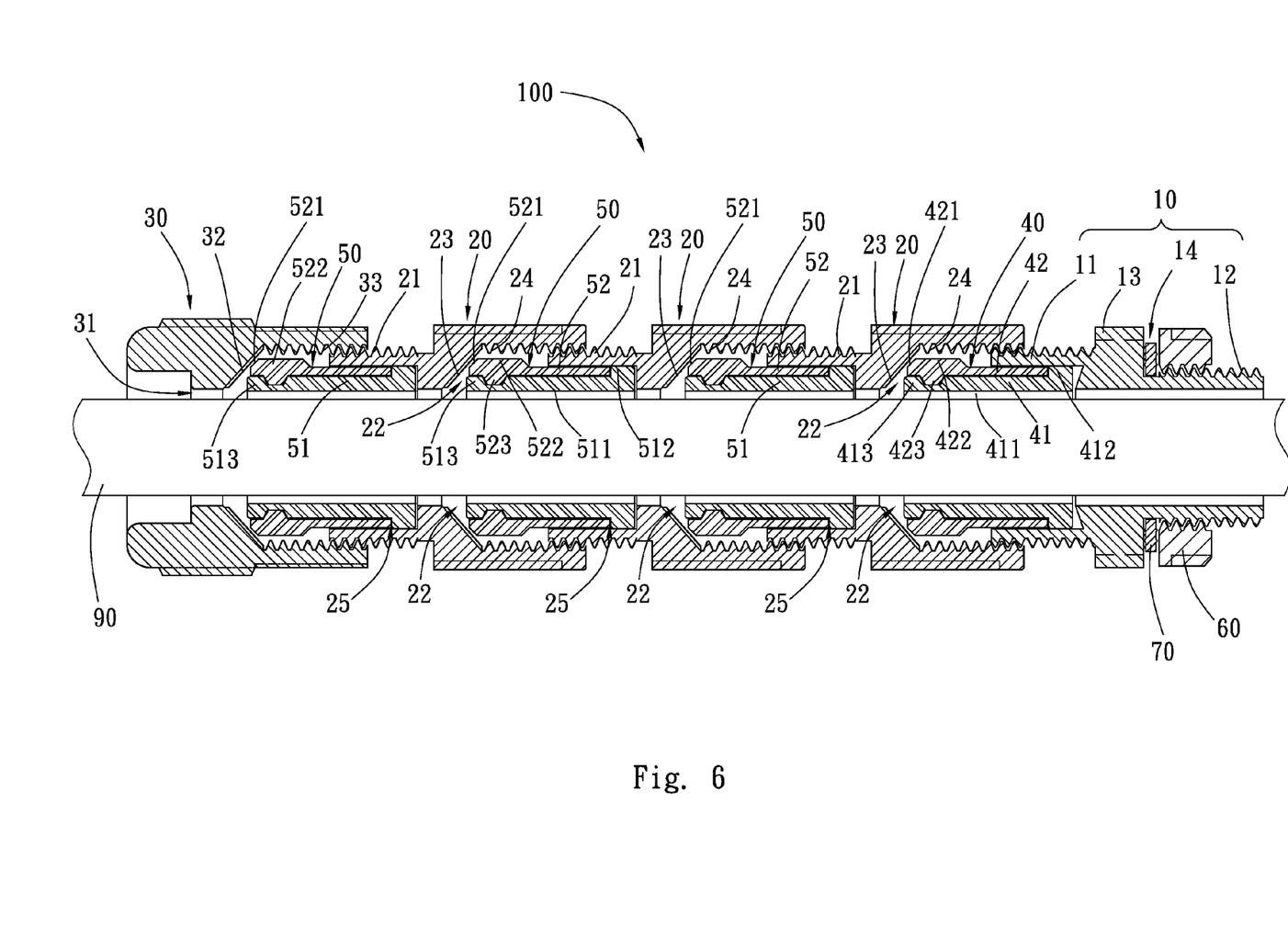
FIG. 6 is a longitudinal sectional view of the embodiment shown in FIG. 5.

Referring to FIGS. 5 and 6, the user can add extra connection member 20 and second packing device 50 to the cable gland assembly to meet different industrial application requirements.

In one alternate form of the present invention, two connection members 20 and two second packing devices 50 are used in the cable gland assembly. These two connection members 20 are screw-connected together by means of the second outer thread 21 and the first inner thread 24. These two second packing devices 50 are respectively fastened to the through hole 31 of the outer cap 30 and the second axial hole 25 of the connection member 20. Thus, this embodiment provides triple layers of airtight, waterproof, dustproof and anti-tensile effects. Further, the mounting order of the two connection members 20 or the two second packing devices 50 is exchangeable.

In another alternate form of the present invention, three connection members 20 and three second packing devices 50 are used in the cable gland assembly. These three connection members 20 are screw-connected together by means of the second outer thread 21 and the first inner thread 24. These three second packing devices 50 are respectively fastened to the through hole 31 of the outer cap 30 and the second axial hole 25 of the connection member 20. Thus, this embodiment provides four layers of airtight, waterproof, dustproof and anti-tensile effects. Further, the mounting order of the three connection members 20 or the three second packing devices 50 is exchangeable.

Figure 7:
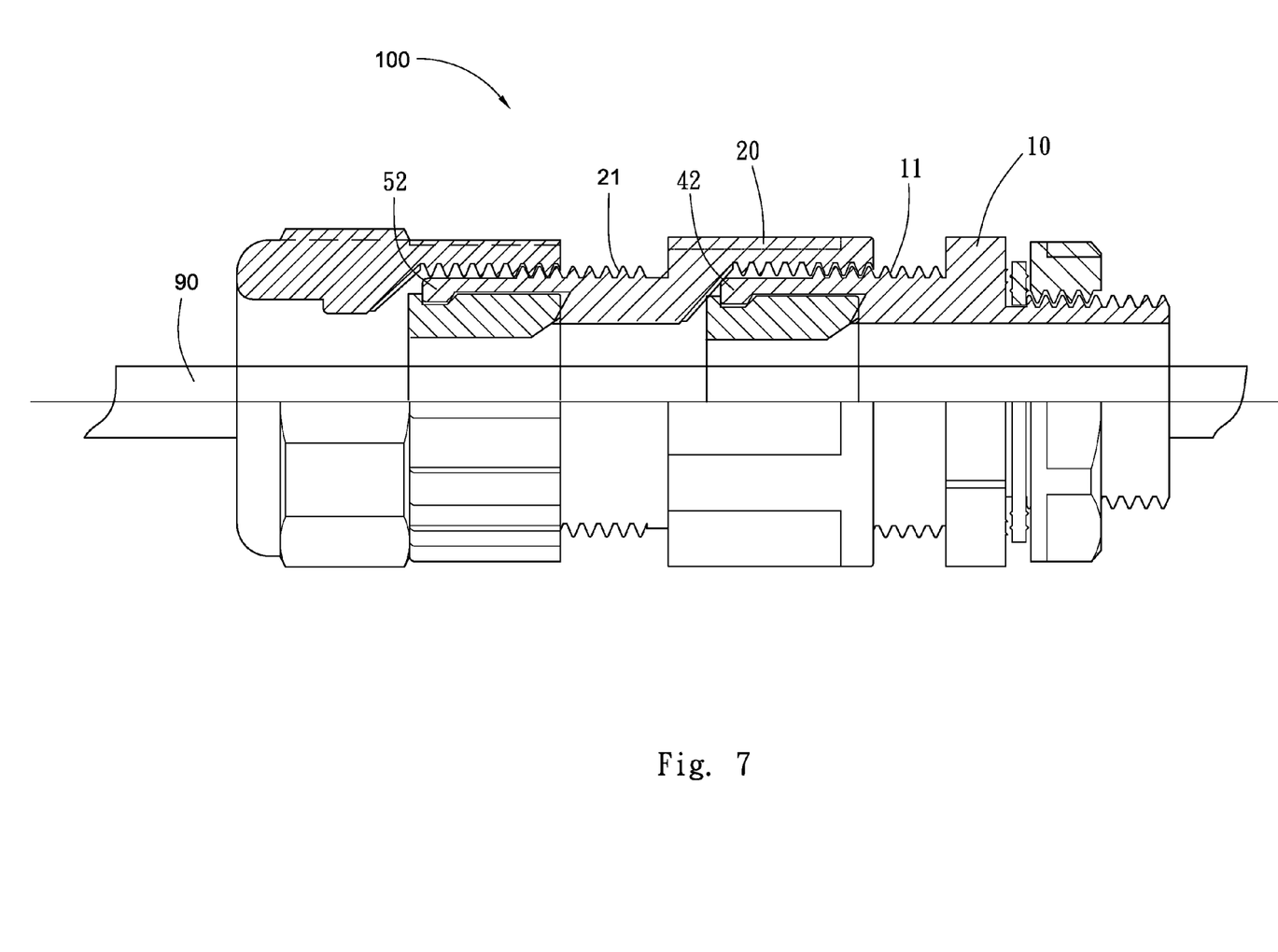
FIG. 7 is a schematic sectional view of another alternate form of the cable gland assembly in accordance with the present invention.

In still another alternate form of the present invention, as shown in FIG. 7, the first clamping member 42 is formed at an inner side of the first outer thread 11 of the mounting member 10, i.e., the first outer thread 11 and the first clamping member 42 are made in integrity. Thus, this embodiment reduces the number of component parts and saves the installation cost.

Further, in the embodiment shown in FIG. 7, the second clamping member 52 is formed at an inner side of the second outer thread 21 of the connection member 20, i.e., the second outer thread 21 and the second clamping member 52 are made in integrity, reducing the number of component parts and saving the installation cost.

In the aforesaid various embodiments of the present invention, during connection between the cable gland assembly 100 and the cable 90, the cable 90 is inserted in proper order through the through hole 31 of the outer cap 30 into the second packing device 50, the connection member 20, the first packing device 40 and the mounting member 10. After insertion of the cable 90 through the cable gland assembly 100, rotate the connection member 20 to compress the second packing device 50 against the periphery of the cable 90. The packing principle and action of the second packing device 50 are same as the first packing device 40.

Thus, by means of increasing the number of the connection member 20 and the number of the second packing device 50, the invention multiplies the packing, airtight, waterproof, dustproof and anti-tensile effects, allowing the cable gland assembly to be used in severe weather environments, deepwater environments or high explosive atmospheres.

In conclusion, the invention provides a cable gland assembly, which has the functions and advantages as follows:

1. The rating 100%-IP68 makes the cable gland assembly practical for underwater application.

2. The cable gland assembly provides enhanced protection against typhoon and hurricane.

3. The cable gland assembly provides dynamic waterproof effects.

4. The cable gland assembly breaks the general waterproof and anti-tensile limits.

5. The cable gland assembly meets UL standard safety requirements that electrical cable clamps and plugs cannot be shaken over 0.6 mm.

6. The well watertight effect of the cable gland assembly is practical for use in a deep-water environment or high explosive atmosphere to protect against gas and water.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A cable gland assembly, comprising:
   a mounting member being a tubular member, said mounting member comprising a first outer thread;
   at least one connection member, each said connection comprising a second outer thread, a first axial hole, a second axial hole in communication and axial alignment with said first axial hole, a first tapered surface defined therein around one end of said first axial hole and one end of said second axial hole, and a first inner thread defined in said first axial hole and threaded onto said first outer thread of said mounting member;
   an outer cap comprising an axial through hole extending through two opposite ends thereof, a second tapered surface defined in said axial through hole, and a second inner thread defined in said axial through hole at one side relative to said second tapered surface and threaded onto said second outer thread of one said connection member;
   a first packing device comprising a first packing sleeve mounted in said mounting member and the first axial hole of one said connection member and defining therein an axially extended first through hole, and a first clamping member mounted in said mounting member and the first axial hole of the respective said connection member and sleeved onto said first packing sleeve; and
   at least one second packing device, each said second packing device comprising a second packing sleeve mounted in the axial through hole of said outer cap and the second axial hole of one said connection member and defining therein an axially extended second through hole, and a second clamping member mounted in the axial through hole of said outer cap and the second axial hole of the respective said connection member and sleeved onto said second packing sleeve, each said second packing device being identical to and exchangeable with said first packing device.

2. The cable gland assembly as claimed in claim 1, wherein said mounting member further comprises a third outer thread and a stop flange extending around the periphery thereof between said first outer thread and said third outer thread; the cable gland assembly further comprises a locking member threaded onto the third outer thread of said mounting member to lock said mounting member to a predetermined external object.

3. The cable gland assembly as claimed in claim 2, wherein said first packing sleeve of said first packing device comprises an end flange and a neck portion; said first clamping member is sleeved onto said first packing sleeve and stopped at the end flange of said first packing sleeve, comprising a plurality of equiangularly spaced pawls respectively terminating in a respective clamping block that is engaged into the neck portion of said first packing sleeve.

4. The cable gland assembly as claimed in claim 3, wherein said first clamping member of said first packing device further comprises a beveled edge located at an outer end of each pawl thereof and stopped against said first tapered surface of the respective said connection member.

5. The cable gland assembly as claimed in claim 4, wherein the number of said at least one connection member is 2, and these said two connection members are screw-connected by threading the second outer thread of one of said two said connection members into the first inner thread of the other of said two connection members; the number of said at least one second packing device is 2, and these two second packing devices are respectively mounted in said outer cap and the second axial hole of each said connection member.

6. The cable gland assembly as claimed in claim 4, wherein the number of said at least one connection member is more than 3, and these said connection members are screw-connected by threading the second outer thread of one said connection member onto the first inner thread of another said connection member; the number of said at least one second packing device is more than 3, and these second packing devices are mounted in said outer cap and the second axial hole of each said connection member.

7. The cable gland assembly as claimed in claim 2, wherein the second packing sleeve of each said second packing device comprises an end flange and a neck portion; the second clamping member of each said second packing device is sleeved onto the associating said second packing sleeve and stopped at the end flange of the associating said second packing sleeve, comprising a plurality of equiangularly spaced pawls respectively terminating in a respective clamping block that is engaged into the neck portion of the associating said second packing sleeve.

8. The cable gland assembly as claimed in claim 7, wherein the number of said at least one connection member is 2, and these said two connection members are screw-connected by threading the second outer thread of one of said two said connection members into the first inner thread of the other of said two connection members; the number of said at least one second packing device is 2, and these two second packing devices are respectively mounted in said outer cap and the second axial hole of each said connection member.

9. The cable gland assembly as claimed in claim 7, wherein the number of said at least one connection member is more than 3, and these said connection members are screw-connected by threading the second outer thread of one said connection member onto the first inner thread of another said connection member; the number of said at least one second packing device is more than 3, and these second packing devices are mounted in said outer cap and the second axial hole of each said connection member.

10. The cable gland assembly as claimed in claim 7, wherein the second clamping member of each said second packing device further comprises a beveled edge located at an outer end of each pawl thereof for stopping against said second tapered surface of said outer cap.

11. The cable gland assembly as claimed in claim 10, wherein the number of said at least one connection member is 2, and these said two connection members are screw-connected by threading the second outer thread of one of said two said connection members into the first inner thread of the other of said two connection members; the number of said at least one second packing device is 2, and these two second packing devices are respectively mounted in said outer cap and the second axial hole of each said connection member.

12. The cable gland assembly as claimed in claim 10, wherein the number of said at least one connection member is more than 3, and these said connection members are screw-connected by threading the second outer thread of one said connection member onto the first inner thread of another said connection member; the number of said at least one second packing device is more than 3, and these second packing devices are mounted in said outer cap and the second axial hole of each said connection member.

13. The cable gland assembly as claimed in claim 10, wherein said first clamping member is formed integrally with said mounting member at an inner side relative to the first outer thread of said mounting member.

14. The cable gland assembly as claimed in claim 10, wherein said second clamping member is formed integrally with one said connection member at an inner side relative to the second outer thread of the respective said connection member.

15. The cable gland assembly as claimed in claim 1, wherein the number of said at least one connection member is 2, and these said two connection members are screw-connected by threading the second outer thread of one of said two said connection members into the first inner thread of the other of said two connection members; the number of said at least one second packing device is 2, and these two second packing devices are respectively mounted in said outer cap and the second axial hole of each said connection member.

16. The cable gland assembly as claimed in claim 1, wherein the number of said at least one connection member is more than 3, and these said connection members are screw-connected by threading the second outer thread of one said connection member onto the first inner thread of another said connection member; the number of said at least one second packing device is more than 3, and these second packing devices are mounted in said outer cap and the second axial hole of each said connection member.

17. The cable gland assembly as claimed in claim 16, wherein said first clamping member is formed integrally with said mounting member at an inner side relative to the first outer thread of said mounting member.

18. The cable gland assembly as claimed in claim 16, wherein said second clamping member is formed integrally with one said connection member at an inner side relative to the second outer thread of the respective said connection member.

* * * * *